(12) United States Patent
Kim et al.

(10) Patent No.: US 11,649,106 B2
(45) Date of Patent: May 16, 2023

(54) FRUIT BAG FOR A FRUIT OF FRUIT TREE WITH NANO-LAMINATION FILM AND MANUFACTURING METHOD THEREOF

(71) Applicant: LEMON CO., LTD., Gumi-si (KR)

(72) Inventors: Hyo Gyu Kim, Seoul (KR); Kun Ho Ko, Jeju-si (KR); Min Jung Lee, Gumi-si (KR); Dong Geun Kim, Daegu (KR); Min Kyung Kwon, Daegu (KR); Won Heum Park, Daegu (KR)

(73) Assignee: LEMON CO., LTD., Gumi-si (KR)

( * ) Notice: Subject to any disclaimer, the term of this patent is extended or adjusted under 35 U.S.C. 154(b) by 322 days.

(21) Appl. No.: 17/005,414

(22) Filed: Aug. 28, 2020

(65) Prior Publication Data
US 2021/0229899 A1 Jul. 29, 2021

(30) Foreign Application Priority Data
Jan. 28, 2020 (KR) .................. 10-2020-0009742

(51) Int. Cl.
*B65D 85/34* (2006.01)
*B32B 5/02* (2006.01)
(Continued)

(52) U.S. Cl.
CPC ......... *B65D 85/34* (2013.01); *A01G 13/0237* (2013.01); *B32B 5/022* (2013.01); *B32B 37/00* (2013.01); *B32B 37/06* (2013.01); *B32B 37/10* (2013.01); *B32B 37/1284* (2013.01); *B32B 38/0004* (2013.01); *B32B 38/145* (2013.01); *B32B 38/185* (2013.01); *B65D 81/18* (2013.01); *B32B 2037/1215* (2013.01); *B32B 2037/243* (2013.01); *B32B 2038/0052* (2013.01);
(Continued)

(58) Field of Classification Search
CPC ................ A01G 13/0237; B32B 5/022; B32B 2305/18; B32B 2307/7265; B32B 2439/06; B32B 2439/70
See application file for complete search history.

(56) References Cited

FOREIGN PATENT DOCUMENTS

JP 2850423 B2 8/1991
KR 10-2002-0061685 A 7/2002
(Continued)

OTHER PUBLICATIONS

Written Opinion Of The International Searching Authority for PCT/KR2020/009184, WO2021153862. (Year: 2020).*
English machine translation for KR2009-0115417 (Year: 2009).*

*Primary Examiner* — Michael C Miggins
(74) *Attorney, Agent, or Firm* — Goldilocks Zone IP Law

(57) ABSTRACT

Provided are a fruit bag and a manufacturing method thereof, for example, a fruit bag for a fruit of a fruit tree may include: an inner surface configured to surround the fruit; an outer surface configured to exposed to an outside; an opening formed in a predetermined size at the same position of the inner surface and the outer surface; a nano membrane generated by an electrospinning of a polymer solution as a raw material for nano-fibers; a non-woven fabric for strength reinforcement laminated on one or both sides of the nano membrane and a nano-lamination film covering the entire surface of the opening thereby while maintaining excellent air permeability, it is possible to properly maintain the humidity and against various external environmental effects.

9 Claims, 6 Drawing Sheets

(51) Int. Cl.
  *B65D 81/18*   (2006.01)
  *B32B 37/00*   (2006.01)
  *B32B 37/10*   (2006.01)
  *B32B 38/00*   (2006.01)
  *A01G 13/02*   (2006.01)
  *B32B 37/06*   (2006.01)
  *B32B 37/12*   (2006.01)
  *B32B 38/18*   (2006.01)
  *B32B 38/04*   (2006.01)
  *B32B 37/24*   (2006.01)

(52) U.S. Cl.
  CPC ..... *B32B 2038/042* (2013.01); *B32B 2305/18* (2013.01); *B32B 2307/7265* (2013.01); *B32B 2439/06* (2013.01); *B32B 2439/70* (2013.01)

(56) References Cited

FOREIGN PATENT DOCUMENTS

| | | |
|---|---|---|
| KR | 10-0403892 B1 | 11/2003 |
| KR | 10-2009-0115417 A | 11/2009 |
| KR | 10-2018-0054949 A | 5/2018 |
| KR | 10-2031623 B1 | 10/2019 |

\* cited by examiner

FRUIT BAG FOR A FRUIT OF FRUIT TREE WITH NANO-LAMINATION FILM AND MANUFACTURING METHOD THEREOF

CROSS-REFERENCE TO RELATED APPLICATIONS

This application claims the benefit of priority to Korean Patent Application No. 10-2020-0009742 filed on Jan. 28, 2020, the entire contents of which are incorporated herein by reference.

TECHNICAL FIELD

The present invention relates to a fruit bag, to which a nano membrane and a nano-lamination film with laminated non-woven fabric are attached for a fruit of a fruit tree and a method of manufacturing of the fruit bag.

BACKGROUND ART

The fruit bag cultivation method of planting a fruit using a fruit bag is mainly used in Korea and Japan where suffer from pests by the long rainy season in the summer when the development of pesticides is insignificant.

Since then, as pesticides have been used widely and a rural area labor force has been decreased along with industrialization, there have been cases where non-fruit bag cultivation is chosen instead of the fruit bag cultivation, but fruit bag cultivation is widely used to prevent rot, anthrax, and/or the occurrence of copper green.

Recently, the importance of fruit appearance has been greatly emphasized due to the rapid increase in overseas exports of pears and/or apples, and the need for a bag cultivation using a fruit bag has been increasing, in particular, the need for the cultivation fruit using the fruit bag is increasing to control pests, which are a problem in quarantine when exporting fruits.

Most of the conventional fruit bags are newspaper bags made of imported newspapers, but newspaper bags have a high moisture absorption rate and have a high possibility of a copper green propagation.

A method of treating the inner layer of the fruit bag with paraffin wax to reduce the humidity in the fruit bag was also attempted. However, the effect of reducing humidity was insignificant during a summer rainy season, and thus was not significantly improved the reduction of the humidity.

In addition, in recent years, various attempts have been made to increase the light-shielding property of the bag to increase the effect of fruit bag cultivation or using a double-colored fruit bag with antibacterial and insect repellent treatment using drugs on the fruit bag itself.

In particular, a technique using various air permeability films has been proposed to solve the above-mentioned weak water resistance of the conventional paper bag and effectively overcome the problem of air permeability, which is a limitation of the plastic bag material fruit bag.

For example, there are methods such as adding an inorganic filler to produce an air permeability film or applying a physical transformation such as an embossing treatment on the post-processing of the film.

However, in the case of such an air permeability film, the air permeability also shows an equal level or higher level than that of the paper material.

The material itself is too soft to use itself as a fruit bag, and thus the workability is very poor. It is stuck to the fruit even after the fruit is bagged into the fruit bag, and there is a risk of damage to the skin of the fruit.

Coloring is difficult when it is necessary to use coloration bags according to specific fruits.

An air permeability directly affects the sugar content of fruits, if the environment inside the bag changes rapidly due to changes in the outside air due to too high air permeability, there is a problem that the skin of the fruit bursts or overheats. In addition, there is a problem that the durability of the bag is also reduced.

The mesh material applied for securing air permeability has large pores (100 μm or more), and thus has a poor light-shielding property, which is unsuitable for a coloration fruit bag requiring light-shielding.

On the contrary, increasing a Gram per Square Meter (GSM) of paper or using a low-ventilating bag to reduce air permeability may increase a weight of the fruit bag. As a result of that, a risk of a premature fruit drop may be increased.

In addition, due to the lack of flexibility in the bag and dehydrate, it is difficult to bagging and slow drying.

Accordingly, there is an urgent need for fruit bags that have adequate air permeability and have excellent light shielding properties and that are not physically deformed by pest or external environment.

DETAILED DESCRIPTION OF THE INVENTION

Technical Problem

The present invention is related to overcome the problems and limitations of the prior art, It is an object of the present invention is to provide a fruit bag for a fruit tree, which may ensure the air permeability of fruit bags for fruit trees, prevent water inflow from outside, emit water vapor, and control humidity.

Another object of the present invention is to provide a fruit bag for fruit trees which easy to color the fruit bag according to characteristics of the fruit and has high water repellency, so that physical strength of the fruit can be maintained for a long time.

Solution for Solving Problems

The present invention provides for solving the above technical problems, a fruit bag for fruit trees having an inner surface that forms an inner side as a portion surrounding a fruit and an outer surface that forms an outer side exposed to the outside;

at least one opening formed in a predetermined size at the same position of the inner surface and the outer surface; and a nano-lamination film configured to cover the opening.

At this time, the nano-laminated film may include a nano-membrane produced by electrospinning a polymer solution as a raw material for nano-fibers; and a non-woven fabric for strength reinforcement laminated on one or both sides of the nano-membrane.

The nano-membrane and/or the non-woven fabric for strength reinforcement may be coated with a hot melt adhesive in a range of 2.5 to 10 g/m².

A weight of the nano-membrane of the nano-lamination film may be in a range of 2.0 g/m² to 6.0 g/m².

A thickness may be in a range of 3.0 μm to 15.0 μm, and the air permeability is preferably 0.6 cubic feet/minute (CFM) or more in an atmosphere of 125 Pa.

In addition, the shape of the nano-lamination film is preferably a rectangle to facilitate slitting and minimize waste of material, and a shape of the opening may be a circular shape for easy punching. However, it is not limited thereto.

In addition, the nano-lamination film may be attached to an inner surface, the inner surface and the outer surface may be manufactured separately and bonded to each other, and the nano-lamination film may be interposed at an interface between the inner surface and the outer surface.

In particular, the outer surface is preferably made of a non-woven fabric to facilitate printing or coloring of promotional phrases, product classification, and information.

In addition, the outer surface and the inner surface may be a single layer made of the same material, and the inner surface may be coated to have a water-repellent coating to prevent moisture permeation.

As a method of manufacturing a fruit bag for fruit protection according to an embodiment of the present invention, the method of manufacturing the fruit bag having an inner surface surrounding a fruit and an outer surface, may include:

forming an opening having a predetermined size by punching at the same position of the inner surface and the outer surface;

attaching a nano-lamination film to cover the opening; and manufacturing a bag having a space to wrap the fruit sufficiently.

At this time, the nano-lamination film is prepared by electrospinning a polymer solution as a raw material of nanofibers, to produce nanomembrane, and laminate a non-woven fabric for strength reinforcement on one or both sides of the nanomembrane.

The nano-membrane and/or the strength-reinforced non-woven fabric are laminated by applying a hot melt adhesive of 2.5 to 10 $g/m^2$, and the weight of the nano-membrane of the nano-lamination film is in a range of 2.0 $g/m^2$ to 6.0 $g/m^2$, and the thickness is preferably 3.0 μm to 15.0 μm and the air permeability is preferably 0.6 CFM or more in an atmosphere of 125 Pa. however, it is not limited thereto.

At this time, the inner surface as a portion surrounding a fruit and the outer surface as portion exposed to the outside may be separately manufactured, and opening(s) are formed by punching each of the same positions of the inner surface and the outer surface in a predetermined size.

The inner surface and the outer surface may be joined in a state in which a nano-lamination film to cover the opening is interposed between the inner surface and the outer surface.

Likewise, the opening formed in the inner surface and the outer surface is manufactured in a circular shape for easy punching, and the nano-lamination film is preferably cut into squares to slit with easy and to minimize waste of material.

However, the shapes can vary according to aspect(s) of the present invention.

Cutting of the nano-lamination film may be performed by winding on the second roll while cutting in the longitudinal direction using a plurality of knives arranged at regular intervals along the width direction of the nano-lamination film wound on the first roll and cutting in a width direction while unwinding the nano-lamination film wound on the second roller.

At this time, the outer surface is made of a non-woven fabric so that printing is possible thereon, and it is preferable to print various promotional phrases, product information or usage information, etc. on the outer surface, and it is preferable to apply a moisture-repellent and water-repellent coating on the inner surface.

In addition, it is good to attach the nano-lamination film to the inner surface of the endothelium. The outer shell and the endothelium are made of a single layer of the same material, and water-repellent coating is applied to the inner surface of the endothelium.

It is particularly preferable to print on the outer surface and attach the nano-lamination film to the inner surface after forming the opening.

Effects of Invention

According to aspect(s) of the present invention, a fruit bag for a fruit of fruit tree having the above configuration, it is excellent in an air permeability to prevent a dew condensation due to a temperature difference between the inside and the outside of the fruit bag.

Due to the nature of the nano-lamination film, an air passes therethrough and a moisture does not pass therethrough, it has the effect of taking advantage of a coloration bag.

In addition, water vapor generated from the inside of the fruit bag can be emitted to the outside of the fruit bag, thereby preventing the propagation of various pathogens due to a moisture.

Further, preventing damage to the skin, cracking, and/or color changes caused by excessive moisture absorption on the fruit surface.

In particular, it is possible to reduce a fruit sun burn due to high temperature of fruit by preventing the temperature in the sealed fruit bag from rising in a high temperature in the summer.

In addition, using a non-woven fabric capable of printing various information, having a water-repellent coating for water repellency, it is possible to secure air permeability, and thus has a significant effect in harvesting fruits of good quality and without damage to appearance.

BRIEF DESCRIPTION OF DRAWINGS

The above and other objects, features and advantages of certain exemplary embodiments of the present invention will be more apparent from the following detailed description taken in conjunction with the accompanying drawings, in which.

DETAILED DESCRIPTIONS OF THE INVENTION

Hereinafter, the fruit bag according to aspect(s) of the present invention will be described in more detail through preferred embodiments according to the accompanying drawings.

Figure 1:
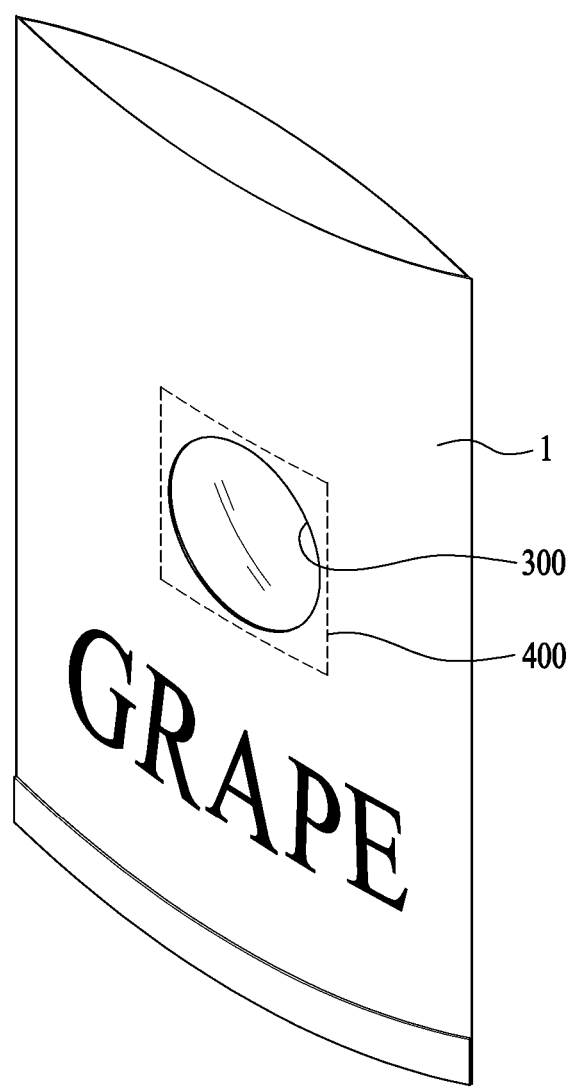
FIG. 1 is a perspective view showing a fruit bag for fruit according to an embodiment of the present invention.

FIG. 1 is a perspective view showing the appearance of a fruit bag for a fruit according to an embodiment of the present invention.

The fruit bag for a fruit of FIG. 1 may include an inner surface 100 that forms an inner side as a part surrounding the fruit, and an outer surface 200 that forms an outer side exposed to the outside.

As will be described later, the outer surface and the inner surface are a single layer of the same material, and may be a structure that may designate the inner surface and the inner surface.

Although FIG. 1 illustrates a single layer of the same material, the outer surface and the inner surface may be manufactured separately using different materials and stacked and bonded together.

Both the inner surface 100 and the outer surface 200 are non-woven fabrics or pulp material, which have excellent air permeability and have good ink permeability, so it is easy to print information such as business information, product information, and usage information.

However, since this non-woven fabric or pulp material is hygroscopic and retains moisture by itself, there is a problem in that the physical strength is poor in a high-temperature and humid environment, and water-repellent is coated on the inner surface to prevent moisture permeation.

Water-repellent coating agents may include paraffin wax, paraffin wax emulsion, oil, fat emulsion, and drying methods of water-repellent agent may include a cooling and a hot air method.

For example, a cooling method may include the following operations:

1) a liquid coating composition is prepared by adding one or two more resins selected from the group consisting of ethylene vinyl acetate copolymer, polystyrene, low density polyethylene, and polyvinyl acetate, which are reinforcing materials, to a paraffin wax solution melted by heating.

2) a liquid coating composition is put in a storage tank, impregnated on both sides by passing through the paper material, and then heat-pressed to penetrate the coating composition to the inside of the paper material and apply a uniform thickness.

3) a cooling method is a method of rapidly cooling the paper material coated with the liquid coating composition on a cooling roll, and a hot air method is a method of drying by blowing hot air on a cooling roll.

The fruit bag 1 for a fruit of a fruit tree shown in FIG. 1 has a shape of a general envelope with an open top, and a circular opening 300 having a diameter of about 10 cm in the middle of the fruit bag 1.

The opening 300 was formed by punching using a circular jig on the fruit bag shown in FIG. 1.

The shape of the opening 300 is in a circular, there is no dent by minimizing the angled portion during punching, and it is symmetrical in any direction, thereby providing a sense of stability in appearance.

That is, the opening 300 is not limited to a circular shape, and may be of various shapes such as a square, if necessary, and its size may also vary depending on the type of the fruit.

The number of openings 300 are also not necessarily only one, and the openings 300 may be formed by combining various shapes, sizes, and numbers.

As one of the main features of the fruit bag 1 for the fruit according to an aspect of the present invention, the nano-lamination film 400 covering the entire area of the opening 300 is attached.

Figure 2:
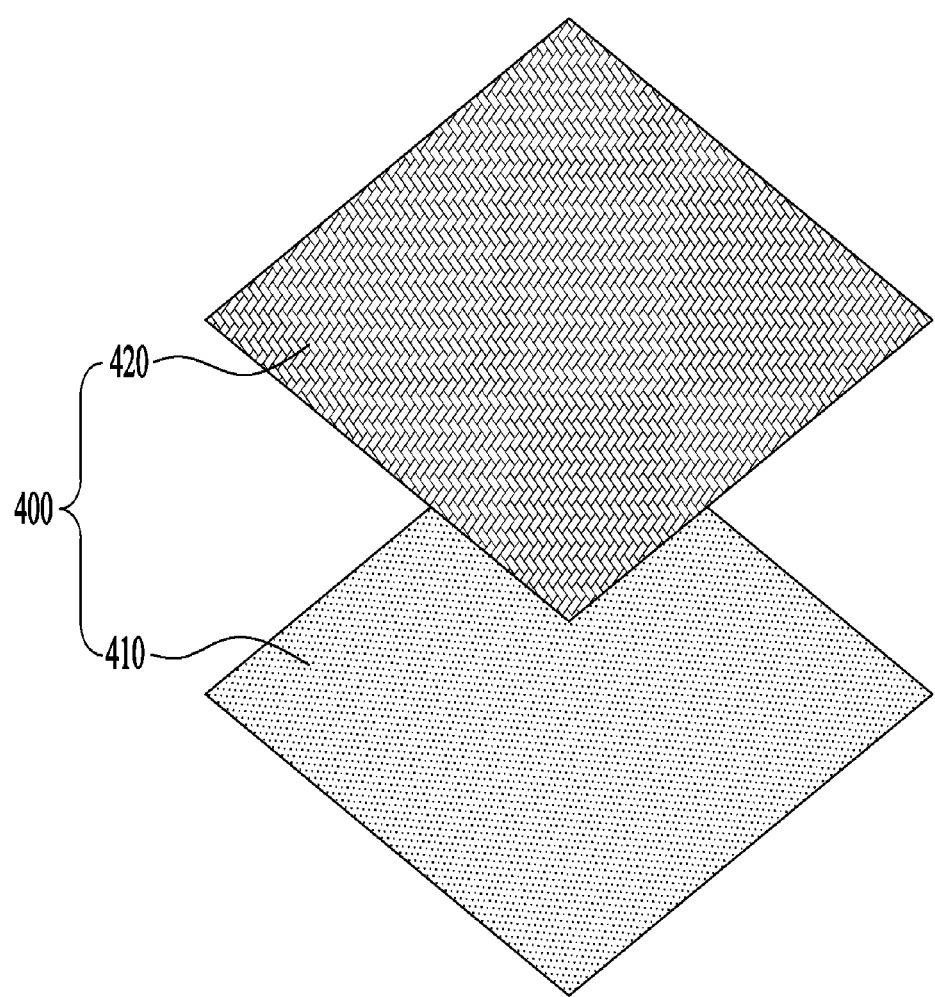
FIG. 2 is an exploded perspective view showing the configuration of the nano-lamination film applied to FIG. 1.

FIG. 2 is an exploded perspective view showing the structure of the nano-lamination film 400 used in a fruit bag 1 for a fruit tree according to aspect(s) of the present invention.

The nano-lamination film 400 may have a laminated structure with a nonwoven fabric 420 on one side of the nano membrane 410, which has air permeability and water molecules impregnable air gap, to reinforce strength of the nano-lamination film 400.

In a case of the fruit bag 1 for fruit shown in FIG. 1, the nano-lamination film 400 is attached to the inner surface 100 of the fruit bag 1 (indicated by a dotted line in FIG. 1), in this case, If the nano-lamination film 400 is attached to the outer surface, it is inevitable that the scrap exposed to the outside in a region other than the opening 300, and foreign matter may adhere thereto due to rain or spraying of pesticides.

The nano-lamination film 400 is cut to a predetermined size according to a size of the opening 300, and may be attached by pressure against the inner surface to cover the entire area of the opening 300 in the expanded view of the fruit bag 1, or by a heat treatment method or the like, and can also be attached by an adhesive.

The shape of the nano-lamination film 400 is cut into squares to facilitate slitting, which will be described later, and minimize waste of material.

At this time, it is preferable that the nano membrane 410 of the nano-lamination film 400 is attached in a direction toward the inside.

Because the nano membrane 410 is relatively weak to external shocks or external forces, there is a possibility that it is easily damaged when a physical external force caused by heavy rain, birds, or insects acts.

Also, if the nano membrane 410 is partially damaged, it may affect breathability or waterproofness.

In addition to the structure in which the non-woven fabric 420 for strength reinforcement is laminated to one surface of the nano membrane 410, a structure laminated to both surfaces is also possible.

The structure in which the nano membrane 410 is laminated on both sides of the non-woven fabric for strength reinforcement 420 is also possible.

Hereinafter, a method of manufacturing the nano-lamination film 400 used in the fruit bag 1 for fruit according to an aspect of the present invention will be described.

The nano-lamination film 400 used in the fruit bag 1 for fruit trees of the present invention is a product that the applicant has mass-produced.

When the nano-lamination film 400 is used in the fruit bag 1 for fruit trees, it is recognized that there is a unique effect that can hardly be predicted as a conventional fruit bag, and the present invention has been derived.

1. Preparation of Nano Membrane 410

Using an electrospinning device, in an electrospinning solution in which the polymer is dissolved (a solution in which the polymer is 1:1 in a weight ratio), the spinning section and the stacked section are separated by a distance of 10 to 30 cm. The nano membrane is prepared by electrospinning under room temperature conditions by adjusting a flow rate of the electrospinning solution to 0.02 to 0.05 ml/min while the applied voltage is adjusted to 10 to 55 kV.

Polymers used as raw materials for nanofibers may include any one selected from the group consisting of a flexible material, a thermoplastic material, polyimide, and a liquid crystal polymer, or a combination thereof. For example, the polymers used as raw materials for nanofibers may include any one selected from the group consisting of polyurethane (PU), polyacrylonitrile (PAN), polyvinyl alcohol (PVA), nylon, polyvinylidene fluoride fluoride (PVdF), and polyhydroxybutyrate (PHB), Polyethersulfone (PES), polyetherimide (PEI), polycaprolactone (PCL), polylactic acid (PLA), and poly-L-lactic acid (PLLA), or a combination thereof.

In addition, a solvent for dissolving the above polymer for electrospinning may include any one selected from the group consisting of dimethyl acetamide (DMA)(, N,N-dimethylformamide (DMF), N-methyl-2-pyrrolidinone (NMP), dimethyl sulfoxide (DMSO) ( ), tetra-hydrofuran (THF), di-methylacetamide (DMAc), ethylene carbonate (EC), diethyl carbonate (DEC), dimethyl carbonate (DMC), ethyl methyl carbonate (EMC), propylene carbonate (PC)), water, acetic acid, f formic acid, chloroform, dichloromethane, acetone, and ethanol or a combination thereof.

2. Manufacturing of Non-Woven Fabric for Strength Reinforcement 420

The nano-lamination film 400 used in the fruit bag 1 for fruit of the present invention is obtained by laminating a non-woven fabric 420 for the strength reinforcement on one side of the nano membrane 410 described above.

The non-woven fabric 420, for strength reinforcement is a configuration for reinforcing the nano membrane 410, which is vulnerable to tearing, in order to perform the intrinsic function of allowing the air to pass therethrough and not permeate the liquid.

PP, PE, PET or the like is used as a raw material for the strength reinforcement nonwoven fabric 420.

According to an aspect of the present invention, using polypropylene (PP), the strength reinforced nonwoven fabric 420 used in the nano-lamination film 400 was manufactured according to a spunbond method.

That is, the PP pallet is placed in a water container, then placed in a hopper and placed in a screw extruder.

The extruder sleeve partition is heated, melted with a continuous pre-filter, sliced in an extruder, and then placed in a rotating box.

Accurate measurement of a metering pump, metering of the melt into a spinneret, sprayed through the nozzle hole to form a continuous melt flow, that is, a raw fiber is formed.

The raw fiber is absorbed by the monomer, cooled by a cold air and drafted into an air, and finally formed into filaments.

The filament is uniformly perforated through a pendulum roller, and the air flow of a positive and a negative pressure is sent by the conveyor curtain to the hot-rolling mill and placed evenly on the net curtain which is heat-bonded by the hot-rolling mill to form a radioactive sticky.

3. Adhesive

The nano membrane 410 and the non-woven fabric for strength reinforcement 420 are laminated by an adhesive according to an embodiment of the present invention.

Hot melt adhesives are thermoplastics that change to a liquid state when a heat is applied, and acrylic resins are used as adhesives having a characteristic of curing at 80% or higher humidity.

The solid adhesive is heated to make it liquid, and applied to the surface of an engraving roller to be applied to one surface of the non-woven fabric 220 for strength reinforcement.

The hot melt adhesive is applied in a form of a dot or a line on one side of the non-woven fabric 220 for reinforcing the strength, and is laminated by attaching the nano membrane 210 and pressing the non-woven fabric 220 and the nano membrane 220.

As a method of applying the hot-melt adhesive to the surface of the non-woven fabric for strength reinforcement, there are a spray method, a roller method, a blanket trans method, etc., but there is no particular limitation of the applying method as long as it does not impair the natural function of the nano membrane after adhesion.

Here, a weight of the adhesive to be transferred to the non-woven fabric is made of various forms depending on the type of non-woven fabric, preferably the surface of the non-woven fabric, which is relatively flat, is about 4~10 $g/m^2$, and the surface of the nonwoven fabric, which is relatively rough, may be used up to about 16 $g/m^2$.

That is, the weight of the hot melt adhesive applied to the nonwoven fabric is made within a range of 4 to 16 $g/m^2$.

If the weight of the hot-melt adhesive is less than 4 $g/m^2$, there is a possibility that the nano membrane 210 and the non-woven fabric 220 for reinforcing strength is separated due to the reduction of the adhesion therebetween. If the weight of the hot-melt adhesive exceeds 16, it affects the air permeability and can not only reduces an air permeability, but also increases the total weight of the nano-lamination film and leaks the adhesive. Thus, it is important not to exceed the above numerical ranges.

4. Laminating

The nano membrane 410 is wound on the first roller, and a non-woven fabric 420 for a strength reinforcement is wound on the second roller, and the nano-lamination film 400 is manufactured by rotating and pressing a piece roller rotating in contact with the second roller, respectively.

First, the adhesive is melted in an extruder at a temperature of about 190° C., and then the adhesive is applied to a surface of the engraving roller with a uniform thickness using a blade.

Then, when the non-woven fabric 420 for the strength reinforcement enters between the engraving roller and the second roller, the adhesive applied to the engraving roller is transferred to the surface of the non-woven fabric 420 for the strength reinforcement.

The non-woven fabric applied with the adhesive is laminated while passing through the pressure roller by attached to the nano membrane 410 entering from the first roller.

At this time, the engraving roller may press the non-woven fabric 420 at a pressure in a range of 3 to 5 $kg/cm^2$, and a surface of the engraving roller may maintain a temperature of about 190° C.

However, it is understood that the temperature of the surface of the engraving roller is not limited thereto.

5. Preparation of Nano-Lamination Film 400

Figure 3:
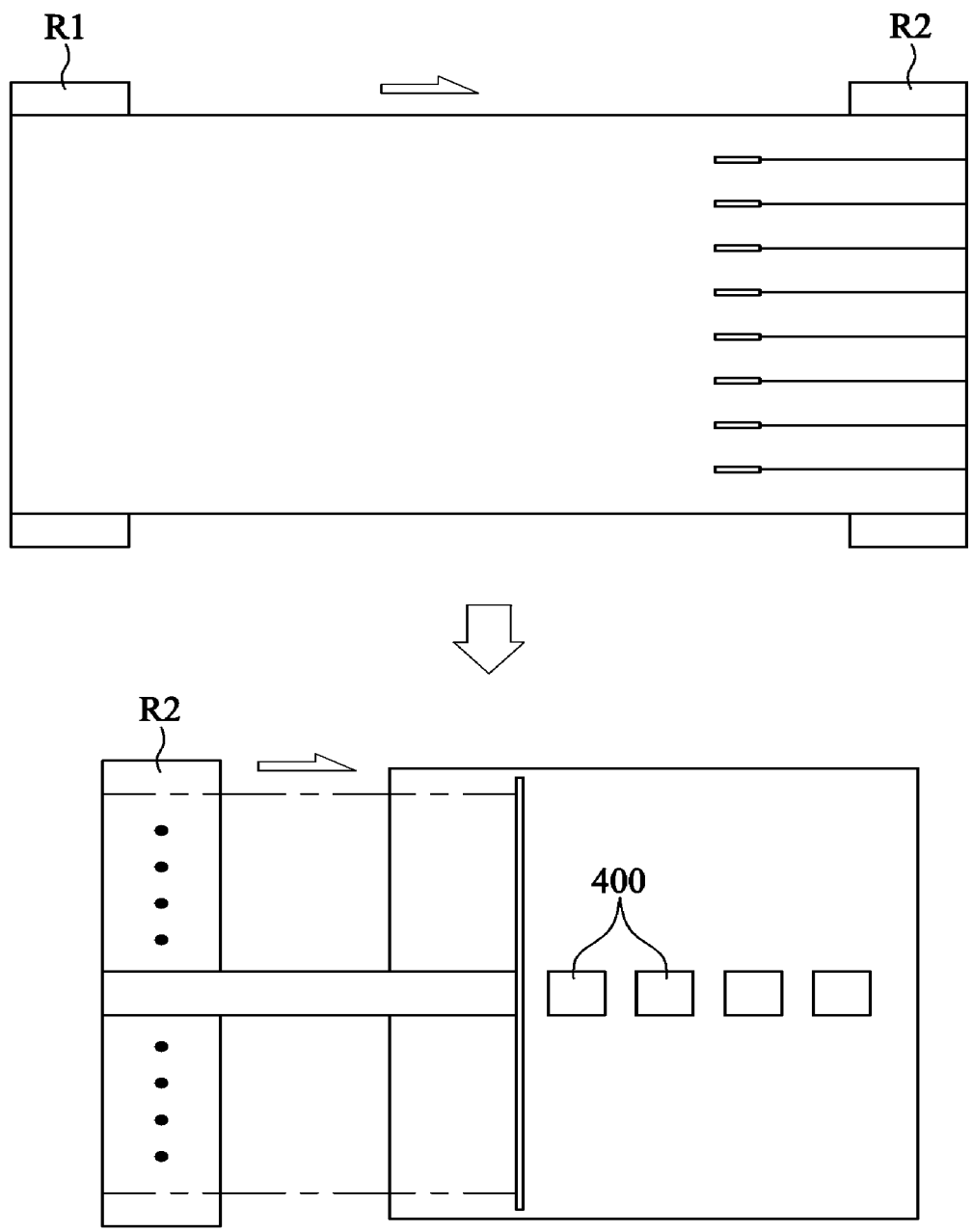
FIG. 3 is a schematic diagram showing a slitting process of the nano-lamination film according to an aspect of the present invention.

FIG. 3 is a schematic diagram of a device for slitting (cutting) the nano-lamination film 400 to correspond to a size of an opening 300 of a fruit bag 1 for a fruit of a fruit tree.

As shown in FIG. 3, slitting in a longitudinal direction using a plurality of knives arranged at regular intervals along in a width direction of the nano-lamination film 400 wound on a first roller R1 (sequential renumbering of the rollers only in a cutting process), winding up on a second roller R2 while rolling.

Cutting the nano-lamination film 400 in a width direction while unwinding the second roller R2 to produce a rectangular nano-lamination film 400.

At this time, an unwinding speed of the second roller and a cutting speed in the width direction are adjusted to cut the nano-laminating film 400 of the required size, so that the nano-lamination film 400 can be arranged at regular intervals.

According to a long-term study result by the applicant, if the air permeability of the nano membrane 410 is less than 0.6 CFM in an atmosphere of 125 Pa, a moisture emitted from the fruit remains in the fruit bag, thereby reducing the productability due to a microbial propagation.

As a result, it was found that at least 0.6 CFM or more air permeability should be ensured.

In addition, although the upper limit for the air permeability of the nano membrane 410 is meaningless, if it is 100 CFM or more, it is easy to get a moisture from the outside, and the rainwater directly hits the fruit in a fruit bag, so that the fruit can be festered. This degree of air permeability cannot be called a nano membrane by electrospinning.

As above, if the thickness of nano membrane is thickened to meet the lower limit of 0.6 cfm in a 125-pa situation, the weight of the fruit bag itself increases, and there is a risk of a premature falling fruit as the fruit tree grows. As the center of gravity moves toward the opening of the fruit bag, the tree trunk can be strained, so it was found that the weight should be adjusted to in a range of 2.0 g/m$^2$ to 6.0 g/m$^2$.

In addition, it was found that when the thickness the nano membrane is 15 μm or more, a ventilation is poor, and if it is 3.0 μm or less, the tensile strength is weakened and workability is deteriorated, so the thickness should be adjusted to in a range of 3.0 μm to 15.0 μm.

Figure 4:
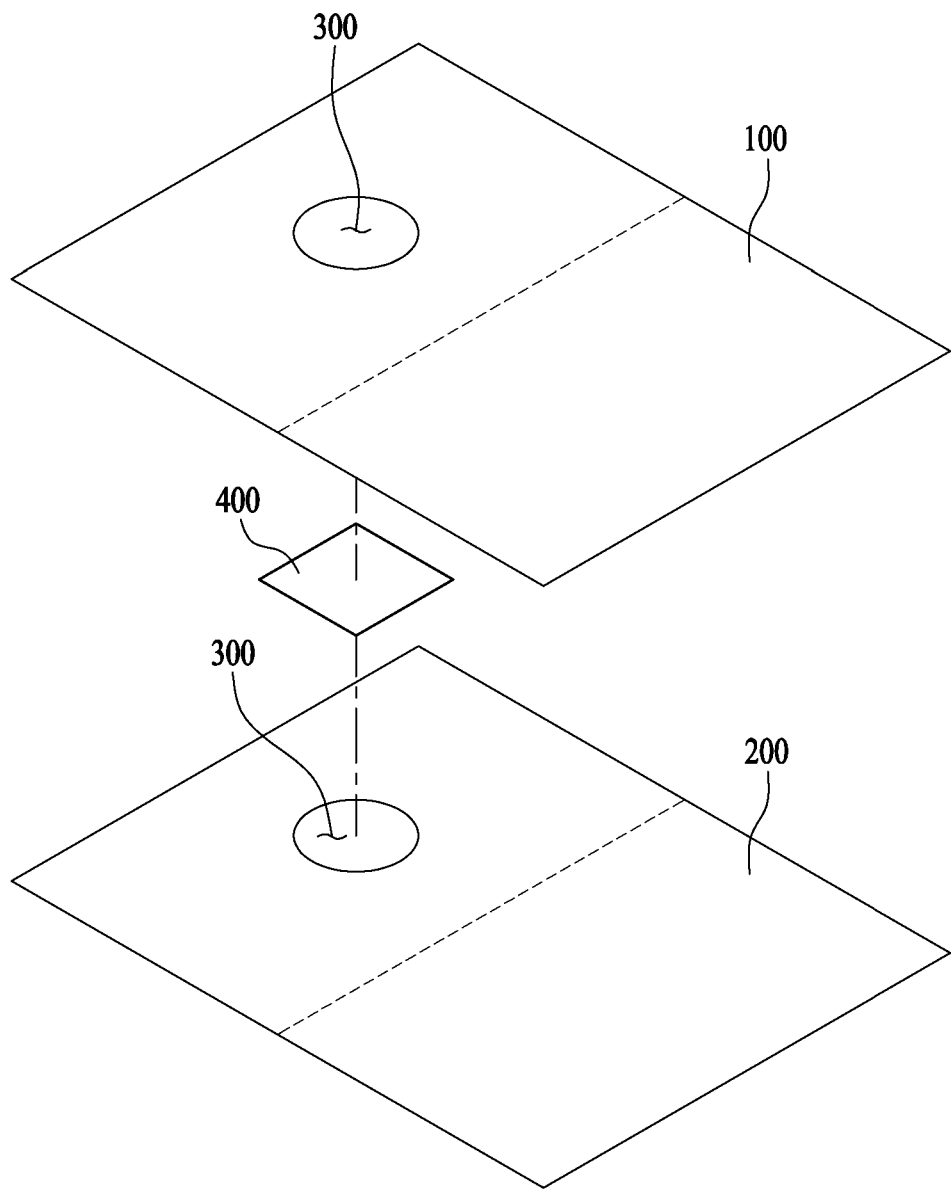
FIG. 4 is a perspective view showing the configuration of a fruit bag for a fruit according to another embodiment of the present invention.

FIG. 4 is another embodiment of the present invention, the inner surface 100 and the outer surface 200 of the fruit bag 1 for fruit tree are manufactured separately and bonded together.

It is an exploded perspective view showing a structure in which the inner surface 100 and the outer surface 200 are joined in a state in which a nano-lamination film 400 is interposed between the inner surface 100 and the outer surface 200.

The dotted line in the middle of the planar view shows the virtual fold when folding with the fruit bag.

Although the structure according to the present embodiment has the disadvantages of separately manufacturing the inner surface 100 and the outer surface 200, with the nano-lamination film 400 placed in a position of the opening 300 between the inner surface 100 and the outer surface 200, since the nano-lamination film 400 is attached by bonding the inner surface 100 and the outer surface 200, the number of processes can be reduced. After the nano-lamination film 400 is attached, the remaining scrap is very clean in appearance because it is not visible anywhere inside or outside.

In addition, since the attachment portion of the nano-lamination film 400 is not exposed both inside and outside, a phenomenon in which impurities are trapped or water is accumulated is basically blocked.

In addition, when the inner surface 100 and the outer surface 200 are manufactured separately, the materials of the inner surface 100 and the outer surface 200 may be different from each other, if necessary. It is easier to perform water-repellent coating on the inner surface 100 of the aforementioned pulp material, Even if the outer side of the outer surface 200 is composed of a non-woven fabric having excellent printability, it is possible to maintain the essential effect of the fruit bag 10 for fruit trees of the present invention due to the high air permeability and waterproofness of the nano-lamination film 400.

In addition, by considering the influence of sunlight on the outer surface of the fruit bag 200 and coloring according to the characteristics of each fruit, it becomes possible to produce fruits with high productivity and high quality.

Figure 5:
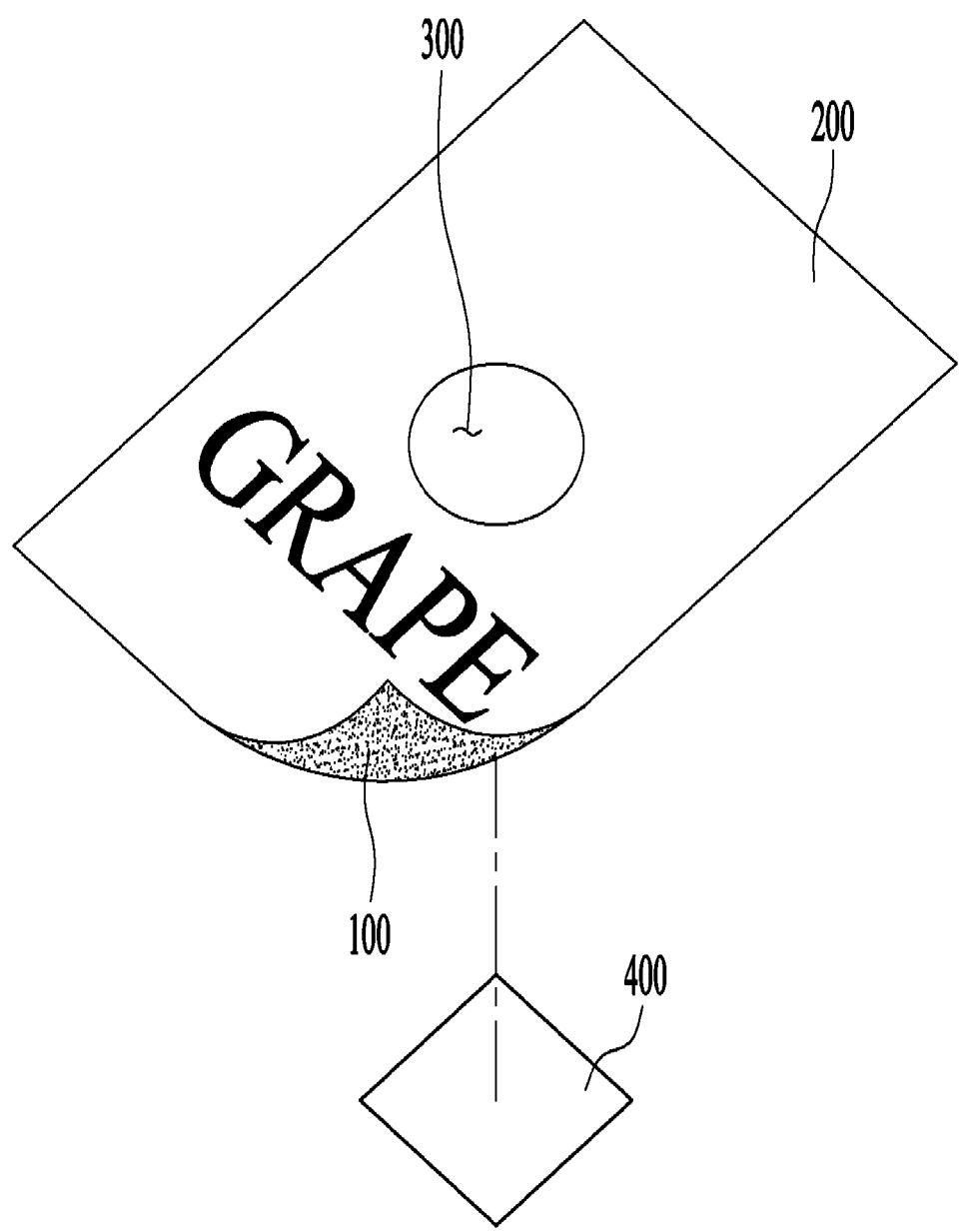
FIG. 5 is a perspective view showing a manufacturing process according to an embodiment of the present invention.

FIG. 5 is a perspective view showing a process of manufacturing a fruit bag according to an embodiment in which the inner surface 100 and the outer surface 200 are made of the same material as a single layer.

The manufacturing method shown in FIG. 5 is to print various information on the outer surface 200, on the inner surface, an opening 300 having a diameter of about 10 cm is formed on the planar view in which the water-repellent coating is applied.

Prepared by the above-described method, the nano-laminated film (400) cut into a square with the length of about 10 cm in one side is completed by attaching it with an adhesive and folding with a bag so as to cover the opening 300 from the inner surface.

In addition, a method of manufacturing a fruit bag for fruit trees according to another embodiment of the present invention, as shown in FIG. 4, the opening 300 is formed by punching at the same position of the inner surface 100 and the outer surface 200, after placing the cut nano-lamination film 400 as described above between the inner surface 100 and the outer surface 200, the inner surface 100 and the outer surface 200 are bonded and folded by folding the fruit bag.

Of course, even in this case, various pieces of information are printed on the outer surface 200.

The inner surface 100 is in a water-repellent coating, but the order of printing, water-repellent coating, formation of the opening 300, etc. can be changed as much as possible. Since the nano-lamination film has a structure in which a nonwoven fabric and a nano membrane are laminated, it can be sufficiently applied to a fruit bag which requires high coloring as well as high tensile strength according to aspect(s) of the present invention, that is, based on the research results that the number of fruit sugar content differs depending on the whiteness, there is a preferred color depending on the fruits, and since the nano membrane itself is white, it is possible to color the non-woven fabric for strength reinforcement, so the effect of this coloring can be fully demonstrated.

Figure 6:
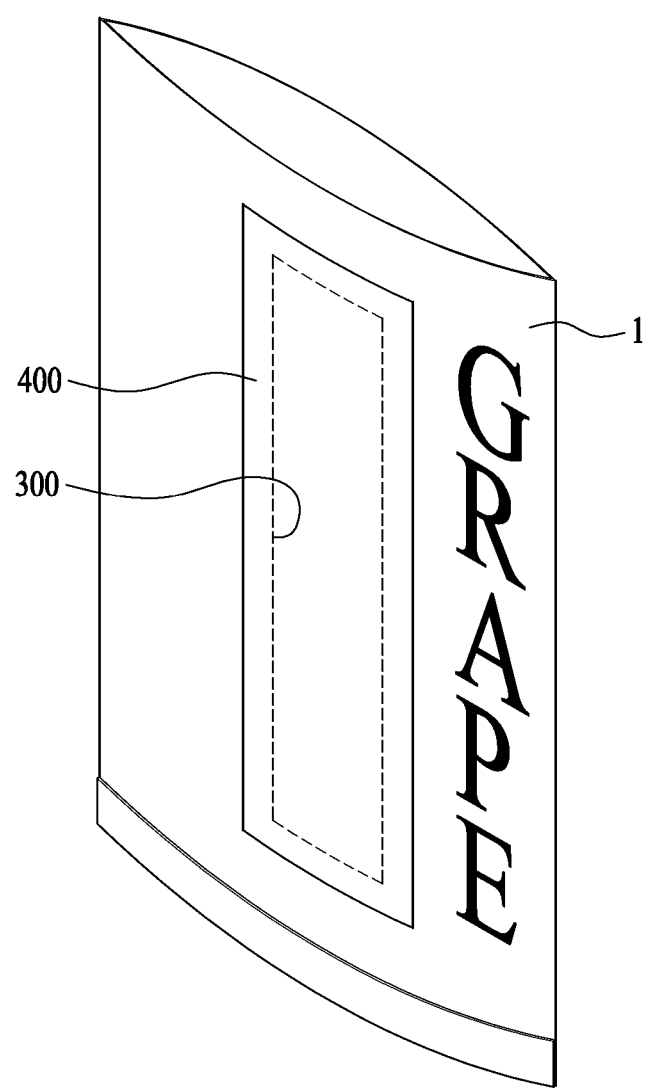
FIG. 6 is a perspective view showing that the shape of the opening in the fruit bag for fruit trees of FIG. 1 is a rectangular shape opening rather than a circular shape as an example according to an embodiment of the present invention.

FIG. 6 is a perspective view illustrating that the shape of the opening in the fruit bag 1 for fruit trees illustrated in FIG. 1 may be various shapes other than a circle.

That is, the fruit bag 1 for a fruit of fruit trees shown in FIG. 6 shows an example in which the shape of the opening 300 is an approximately rectangular shape.

The fruit bag 1 for fruit tree of FIG. 6 is also a conventional envelope shape with an open top, and an approximate rectangular opening 300 is elongated in the longitudinal direction with a width of about 3 cm in a middle of the fruit bag. Since the entire area of the opening 300 covers the nano-lamination film 400 from the outside, the opening 300 is represented by a dotted line, unlike the FIG. 1, the nano-lamination film 400 is expressed by a solid line.

As described above, the fruit bag 1 for fruit trees has been described according to a preferred embodiment, but this is intended to help the understanding of the present invention and is not intended to limit the technical scope of the present invention.

Without departing from the technical scope of the present invention, of course, various design changes, modifications, and transformation are possible.

For example, a shape, number, size, etc. of the opening 300 and/or the nano-lamination film 400 can be variously changed excepting transformation such as a structure of an overall shape or a size of the fruit bag and the nano-lamination film.

In the case of a structure in which the inner surface and the outer surface are laminated with different materials, there may be cases where the openings are punched in a laminated state, or the openings may be formed by punching individually before lamination.

In addition, the method of attaching the nano-lamination film 400 to the inner surface 100 may be a method of binding with a thread or a string as a mechanical method, or may be heat bonding using a melting phenomenon of a thermoplastic film. It may be a bonding using an adhesive, and various methods such as a high-frequency bonding using a high-frequency electric field or an ultrasonic bonding using vibration energy through ultrasonic waves may be applied.

It should be noted that the term "comprising" does not exclude other elements or steps and the "a" or "an" does not exclude a plurality. Also elements described in association with different embodiments may be combined.

Implementation of the invention is not limited to the preferred embodiments shown in the figures and described above. Instead, a multiplicity of variants are possible which use the solutions shown and the principle according to the invention even in the case of fundamentally different embodiments.

What is claimed is:

1. A fruit bag for a fruit of a fruit tree, comprising:
    an inner surface having a first opening configured to surround the fruit;
    an outer surface having a second opening configured to be exposed to an outside;
    a third opening formed in a predetermined size by overlapping the first of the inner surface and the second opening of the outer surface; and
    a nano-lamination film interposed between the inner surface and the outer surface to cover the third opening thereby passing an air therethrough and not passing a moisture therethrough;
    wherein the nano-lamination film includes a nano-membrane generated by an electrospinning of a polymer solution as a raw material for nano-fibers and
    a non-woven fabric for strength reinforcement laminated on one or both sides of the nano membrane,
    wherein a weight of the nano membrane is in a range of 2.0 g/m$^2$ to 6.0 g/m$^2$, and a thickness of the nano membrane is in a range of 3.0 μm to 15.0 μm, the air permeability of the nano membrane is greater than 0.6 CFM in an atmosphere of 125 Pa.

2. The fruit bag of claim 1, wherein the nano membrane and/or the strength reinforced non-woven fabric are laminated by coating with a hot melt adhesive of 2.5 to 10 g/m$^2$.

3. The fruit bag of claim 1, wherein a shape of nano-lamination film is in a rectangular shape.

4. The fruit bag of claim 1, wherein a shape of the third opening is in a circular shape.

5. The fruit bag of claim 1, wherein the inner surface and the outer surface are manufactured separately and bonded to each other thereafter, and the nano-lamination film is interposed at an interface between the inner surface and the outer surface.

6. The fruit bag of claim 1, wherein the nano-lamination film is attached on the inner surface.

7. The fruit bag of claim 6, wherein the inner surface and the outer surface are a single layer of the same material and an inner side of the inner surface is water-repellent coated for preventing moisture permeation.

8. The fruit bag of claim 1, wherein the outer surface is made of the non-woven.

9. The fruit bag of claim 8, wherein the inner surface and the outer surface are a single layer of the same material and an inner side of the inner surface is water-repellent coated.

* * * * *